(12) United States Patent
Jones

(10) Patent No.: US 10,104,082 B2
(45) Date of Patent: Oct. 16, 2018

(54) AGGREGATED INFORMATION ACCESS AND CONTROL USING A PERSONAL UNIFYING TAXONOMY

(71) Applicant: William P. Jones, Kirkland, WA (US)

(72) Inventor: William P. Jones, Kirkland, WA (US)

( * ) Notice: Subject to any disclaimer, the term of this patent is extended or adjusted under 35 U.S.C. 154(b) by 705 days.

(21) Appl. No.: 14/535,124

(22) Filed: Nov. 6, 2014

(65) Prior Publication Data

US 2015/0128063 A1 May 7, 2015

Related U.S. Application Data

(60) Provisional application No. 61/900,876, filed on Nov. 6, 2013, provisional application No. 61/933,740, filed on Jan. 30, 2014.

(51) Int. Cl.
*G06F 17/30* (2006.01)
*H04L 29/06* (2006.01)

(52) U.S. Cl.
CPC .............. *H04L 63/10* (2013.01); *G06F 17/30* (2013.01); *G06F 17/30722* (2013.01)

(58) Field of Classification Search
CPC ........... G06F 17/30722; G06F 3/04842; G06F 17/30; H04L 67/10; H04L 63/10
See application file for complete search history.

(56) References Cited

U.S. PATENT DOCUMENTS

| | | |
|---|---|---|
| 5,983,227 A | 11/1999 | Nazem et al. |
| 6,192,382 B1 | 2/2001 | Lafer et al. |
| 6,643,652 B2 | 11/2003 | Helgeson et al. |
| 7,072,934 B2 | 7/2006 | Helgeson et al. |
| 7,089,583 B2 | 8/2006 | Mehra et al. |
| 7,221,660 B1 | 5/2007 | Simonson et al. |
| 7,703,022 B2 | 4/2010 | Arthurs et al. |
| 7,827,252 B2 | 11/2010 | Hopmann et al. |
| 7,886,033 B2 | 2/2011 | Hopmann et al. |
| 8,208,006 B2 | 6/2012 | Martin-Cocher et al. |
| 2002/0049702 A1 | 4/2002 | Aizikowitz et al. |
| 2002/0049788 A1 | 4/2002 | Lipkin et al. |

(Continued)

FOREIGN PATENT DOCUMENTS

| | | |
|---|---|---|
| EP | 1 703 700 A1 | 9/2006 |
| WO | 2007/014788 A1 | 2/2007 |
| WO | 2007/022323 A2 | 2/2007 |

OTHER PUBLICATIONS

William Jones, XooML: XML in Support of Many Tools Working on a Single Organization of Personal Information, 2011, pp. 478-488 (Year: 2011).*

(Continued)

*Primary Examiner* — Albert M Phillips, III
(74) *Attorney, Agent, or Firm* — Seed IP Law Group LLP

(57) ABSTRACT

Techniques are described for providing users with aggregate access to and control over information from multiple storing applications and information services, and for enabling developers to integrate such aggregate access and control into applications. Textual markup language may represent the structure of grouping items. Examples using XML and XooML ("Cross Tool Mark-up Language," an XML schema) are provided, such that users need not change the storing application or service in order for those users' informational structures to be represented.

15 Claims, 4 Drawing Sheets

(56) References Cited

U.S. PATENT DOCUMENTS

| | | | |
|---|---|---|---|
| 2003/0093444 A1* | 5/2003 | Huxoll | G06F 11/1471 |
| 2004/0046789 A1 | 3/2004 | Inanoria | |
| 2005/0108574 A1 | 5/2005 | Haenel et al. | |
| 2006/0026510 A1 | 2/2006 | Boag et al. | |
| 2006/0064422 A1 | 3/2006 | Arthurs et al. | |
| 2006/0212798 A1 | 9/2006 | Lection et al. | |
| 2007/0234201 A1 | 10/2007 | Fukura et al. | |
| 2007/0240133 A1 | 10/2007 | Neil et al. | |
| 2008/0052384 A1 | 2/2008 | Marl et al. | |
| 2008/0147751 A1* | 6/2008 | Bao | G06F 11/1471 |
| 2008/0147823 A1 | 6/2008 | Azami | |
| 2008/0189323 A1 | 8/2008 | Chang et al. | |
| 2008/0235601 A1 | 9/2008 | Fried et al. | |
| 2009/0024670 A1 | 1/2009 | Petri | |
| 2010/0122156 A1 | 5/2010 | Eves et al. | |
| 2010/0131585 A1 | 5/2010 | Rodrigue et al. | |
| 2010/0318925 A1* | 12/2010 | Sethi | G06Q 10/10 715/760 |
| 2010/0332970 A1 | 12/2010 | Lee et al. | |
| 2011/0023101 A1* | 1/2011 | Vernal | G06F 21/41 726/7 |
| 2011/0320927 A1 | 12/2011 | Jones | |
| 2012/0297400 A1* | 11/2012 | Hill | G06F 17/30855 719/318 |

OTHER PUBLICATIONS

Sun et al., Essentials.xsd, pp. Jun. 17, 3 pages. (Year: 2012).*
"Keeping Things Found—XooML," last updated Aug. 31, 2010, retrieved from http://kftf.ischool.washington.edu/xooml.html, retrieved on Apr. 25, 2016, 2 pages.

* cited by examiner

AGGREGATED INFORMATION ACCESS AND CONTROL USING A PERSONAL UNIFYING TAXONOMY

TECHNICAL FIELD

The following disclosure relates generally to aggregated information access and control, and in particular to techniques for providing users with aggregate access to and control over information from multiple storing applications and information services.

BACKGROUND

Personal information for any particular user typically may be stored across multiple applications and services, with a user's access to such information being application-dependent, service-dependent, and generally tool-dependent, such that the user must (a) remember where (or by what) a given piece or collection of information is stored, (b) access the relevant application/service/tool, and only then is enabled to (c) access the desired information. Furthermore, similar but non-identical pieces of information for a particular user may be stored in multiple disparate applications/services/tools, so that any given application or service only provides part of such information.

For example, suppose that a user has posted family photographs on Service A (e.g., Facebook) but also uploaded other family photographs to Service B (e.g., Google+, Snapchat, Instagram, or any of a variety of other social media services). As long as the user's access to those photographs is dependent upon which particular service is being used, it may be difficult for the user to cohesively and coherently view all of her family photographs. Moreover, the manner in which those photographs may be viewed may be limited by the particular information service. Thus, by uploading or posting the photographs to those information services, she has ceded control of the manner in which she can view or modify them.

Such problems are compounded when considering the wide variety of information and types of information related to and stored for an individual by disparate devices, applications, services, and tools.

This fragmented nature of user information makes PIM (personal information management) difficult.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn, are not intended to convey any information regarding the actual shape of the particular elements, and have been solely selected for ease of recognition in the drawings.

BRIEF SUMMARY

Figure 1:
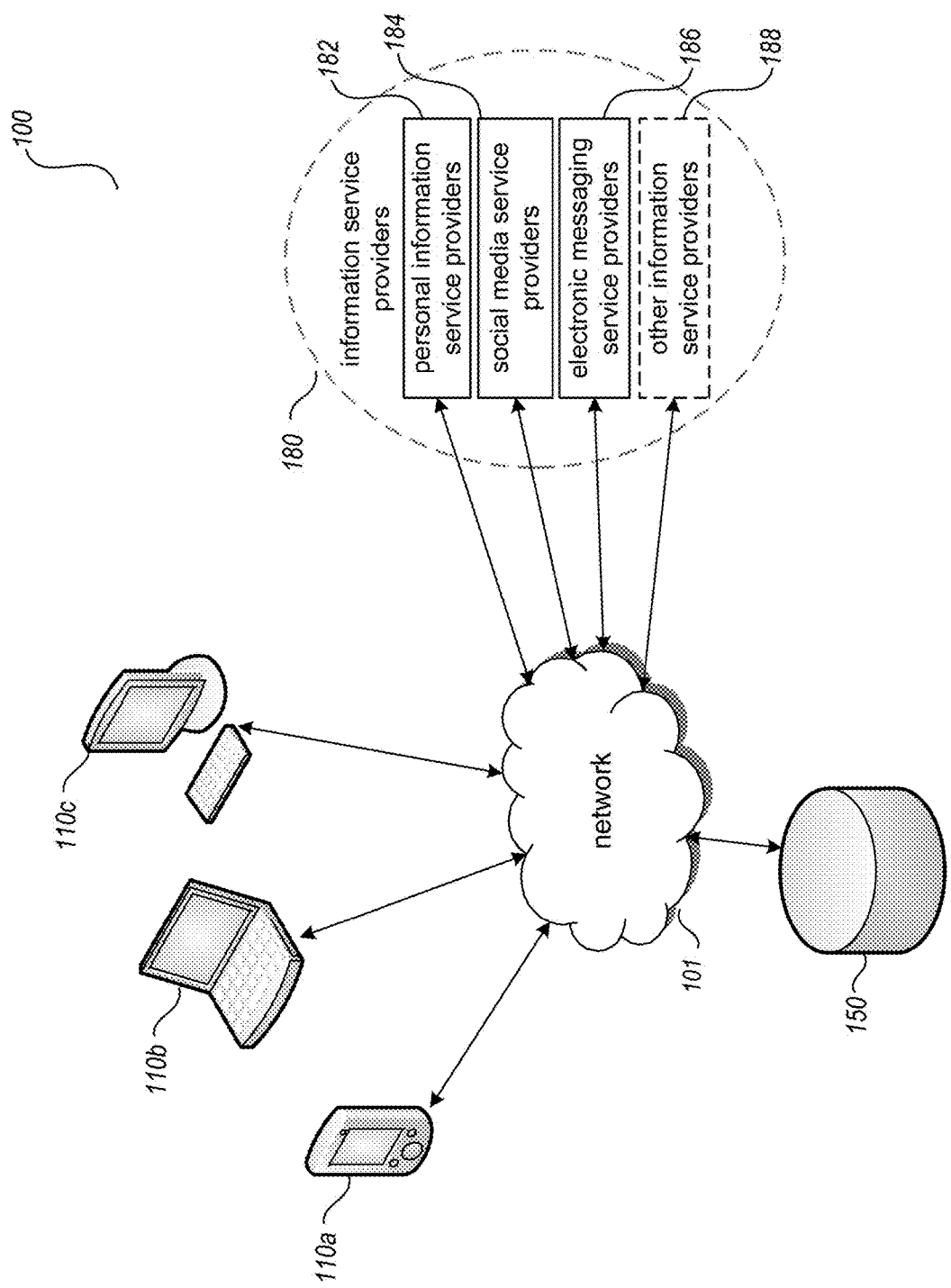
FIG. 1 is a schematic diagram of an exemplary networked environment suitable for practicing at least some of the techniques described in the present disclosure.

Techniques are described for providing users with aggregate access to and control over information from multiple storing applications and information services, and for enabling developers to integrate such aggregate access and control into applications.

DETAILED DESCRIPTION

A method for associating metadata with grouping items (defined/explained below) is described. Metadata is represented using XML (eXtensible Markup Language) according to a Xooml schema (described elsewhere herein). One or more fragments of metadata can be associated with any given grouping item. A XooML metadata fragment can be shared by any number of applications from any number of devices. Each application can persist its own application-specific metadata within a XooML fragment where such metadata co-resides with the metadata of other applications. In addition, applications can view, modify and make common use of the application-independent structure of a grouping item. Applications can also make common use of metadata standards (such as Dublin Core or iCalendar).

Applications, can, by using XooML metadata e.g., as supported through itemMirror (described below), work together through simple use by an end user but without central coordination or any effort at pairwise coordination, to realize mappings of information that are effectively independent of a user's constellation of devices, applications, services and tools. Such a mapping may, for example, have external representation in the form of a Personal Unifying Taxonomy or PUT. The PUT may allow for the integration of personal information, and together with ancillary supporting functions may also provide a unified treatment for activities and circumstances frequently placed in opposition to one another. A PUT may be considered, in at least some implementations:

Personal—People own their PUTs, which are both personal and persistent. A PUT grows and develops over a person's lifetime according to their needs rather than the demands of a current tool set. A PUT can be stored locally or remotely, but may in at least some implementations preserve various benefits of the local file system.

Unifying—All information that relates to a user in one way or another can be classified and organized into the PUT no matter what its form (email, e-document, image, or any other type of information). In some cases the information item itself may reside as a snippet of text in the PUT (e.g., frequently re-used "how to find my office" directions or a hard-to-remember budget number). In many other cases, the information item (file, email, web page) stays where it is (to be managed by its supporting application) and only a reference to this item is stored within the PUT.

Taxonomy—as a basis for a classification of personal information. The structure of the taxonomy may comprise a directed graph rather than a strict hierarchy. In at least certain implementations, and the information item can point (such as via an associated XML fragment) to any number of other information items. In some cases, the item is a folder or a tag with a primary purpose to group or categorize its associated items. In many other cases, it may be a document or a Web page with its own content. Even so, the item can be given a labeling or categorizing interpretation as in "information related to X" or "information needed in order to complete X."

In at least some implementations, a PUT may provide a basis for the organization, manipulation, summarization of and fast access to personal information ranging from snippets of text (names, phone numbers, budget numbers, passwords, etc.) to e-documents and other files to email to a variety of different types of information.

As used herein, a grouping item is a type of information item whose primary purpose is to group together and provide access to other information items. Folders, tags, "section tabs" and "pages" (for Microsoft Outlook), "albums" and "groups" (for Facebook) and "notebooks" as defined (differently) in several applications are each examples of grouping items. Alternatively, in some implementations, any information item may be regarded as a grouping item. When we do so, we consider the item primarily for its function to represent and provide access to other information items (including other grouping items). An ordinary Web page, for example, has its own content but also, via its hyperlinks, provides ready access to other Web pages and their content.

Grouping items are typically referred to in different applications and services by differing terminologies. The information service "Evernote," for example, provides for "notebooks", "notebook stacks" and "tags". Microsoft "OneNote," typically operating as a user application, provides for "notebooks", "section groups", "sections", "pages" and "sub-pages". A file system like that used in Microsoft Windows or on the Macintosh provides for directories or "folders." Even indexing and search utilities such as Lucene can be seen to create a kind of grouping item in the form of a term+links to documents in which the term has been found or to which the term is otherwise associated. Grouping items may differ from one another in many respects, such as the manner of their respective creation and restrictions in their manner of use, which also depend upon the particular application, service or tool being used for such creation and use.

Notwithstanding these and other notable differences, grouping items typically share the following features:
  A basic "noodle" structure, consisting of a node and one or more outgoing links.
  Links may point "directly" (i.e., via an address such as a URI) or indirectly to other information items including, in at least some implementations, to other grouping items. For example, a folder may point to its subfolders and files. An Evernote tag may point to other Evernote tags and to notes that have been "tagged" by the tag.
  The grouping item is addressable by one or more URIs. Through these URIs the node of a grouping item can, in turn be addressed by other grouping items.
  The grouping item often has a name or a label by which it is represented in displays.

Typically, users employ grouping items in one form or another throughout a typical day. Consider these examples:
  To decide which hotel to book, Gordon copies text, pictures and links from the Web for several alternatives, placing information as notes on a OneNote page. Alternatively, he might take notes in Evernote, giving each the tag "hotels-Boston".
  Rashmi is working to complete a complicated application process that requires her to fill out several different forms. She seeks first to place all forms in one place—perhaps in a folder or even as printouts on a physical desktop. She does this to gain a clearer sense of the effort involved and to be sure she has "everything in one place."
  In his search for the current version of a document, Oscar navigates to a local system folder containing several versions as separate files. He then sorts these by "last modified" date before selecting the most recently modified of these.
  Ursula doesn't have a direct address for a targeted Web page but she knows that a hyperlink to this Web page is the second of two that can be found in the "upper right-hand corner" of another page.
  Paolo wants to contribute to an email discussion. To do so, he needs both to locate the most recent post and also to locate previous posts so that he can reflect their content in his response. If he is using Gmail, this grouping is already done for him. But he doesn't know how to do this in Microsoft Outlook so, instead, he opts to see "related messages in this conversation" and he does a reply-all to the most recent post.
  Susan is planning her wedding. Nearly six months prior to the event, she creates a "wedding" folder in her file system in which she places files and also URLs (as shortcuts) that relate to different aspects of her wedding. As her tolerance for "clutter" is reached, she begins to organize items into subfolders for different aspects of her wedding such as "wedding dress", "honeymoon", "reception" and "wedding vows". On the eve of her wedding, the folder structure nicely resembles a problem decomposition for her wedding with grouping items (folders and subfolders) representing sub-areas ("honeymoon") and specific tasks ("decide on wedding dress").

FIG. 1 is a schematic diagram of an exemplary networked environment 100 suitable for practicing at least some of the techniques described in the present disclosure. The illustrated example of FIG. 1 includes a number of client presentation devices 110 that may each be interacting at various times with a variety of information service providers 180 via one or more intervening networks 101. Each of the client presentation devices 110a, 110b, and 110c may include one or more processors, one or more memories, a display component, and various additional input/output elements such as a keypad, mouse, microphone, speakers, additional hardware controls, touchscreen and/or touchpad, etc.

In the depicted environment, the available service providers 180 include personal information service providers 182 (e.g., Evernote, Microsoft OneNote, etc.); social media service providers 184 (e.g., Facebook, Snapchat, Instagram, Twitter, etc.); electronic messaging service providers 186 (e.g., Google's Gmail service, Microsoft's Hotmail service, etc.); and may additionally include other information service providers 188. As used herein, the term "tool," "information service," or "information service provider" may be used, unless context clearly indicates otherwise, to generally describe any local or network-accessible application or service that may be used to store information accessible by and/or associated with a user. In addition, in the depicted example, network environment 100 includes a storage facility 150, which may be local and/or network-accessible storage associated with any or all of the information service providers 180 and client presentation devices 110.

The interactions of users (not shown), client presentation devices 110 and information service providers 180 may occur in various ways, such as, in an interactive manner via one or more graphical user interfaces (not shown) provided by one or more of the information service providers, in a programmatic manner by one or more client software applications via an Application Program Interface ("API," not shown) provided to allow computing systems and/or programs to invoke various functionality programmatically, or in some other manner. Each of the computing systems, devices and services depicted may, in various implementations, include multiple such systems, including processors, servers, and storage media not specifically depicted.

The present disclosure is directed to techniques for using textual markup language (such as XML) to represent—"mirror"—the structure of grouping items (such as folders, tags, "albums," "notebook," Web pages, and any other grouping items). The disclosure herein includes multiple examples using XML and XooML ("Cross Tool Mark-up Language"). However, any other appropriate schema may be used, such as JSON ("JavaScript Object Notation"), RDF ("Resource Description Framework"), etc. In certain implementations, XML may be advantageous due at least in part to its support of namespaces, which may be utilized to accommodate particular applications and information services.

In at least some implementations, one benefit of the mirroring approach is that users need not change the storing application or service in order for those users' informational structures to be represented. Users may instead continue to use the folders, tags, albums, notebooks, etc. to which they have become accustomed.

In at least certain implementations, this structural mirroring may be performed via itemMirror drivers as described herein. Drivers, running from the client side, may in certain implementations operate according to a single itemMirror object model but may vary on their "back end" depending upon the storing application or service. For example, the storing application or service may provide one or more programmatic interfaces (such as an API) for access to those grouping items specific to that application or service. In various implementations, itemMirror is an object class that is supported through a code base in various programming languages for use on different platforms. For example, itemMirror may be used in the construction of HTML5 applications using JavaScript, may be used to build applications on the iOS platform via Objective C for iPhone, iPod Touch and iPad devices, etc.

Figure 2:
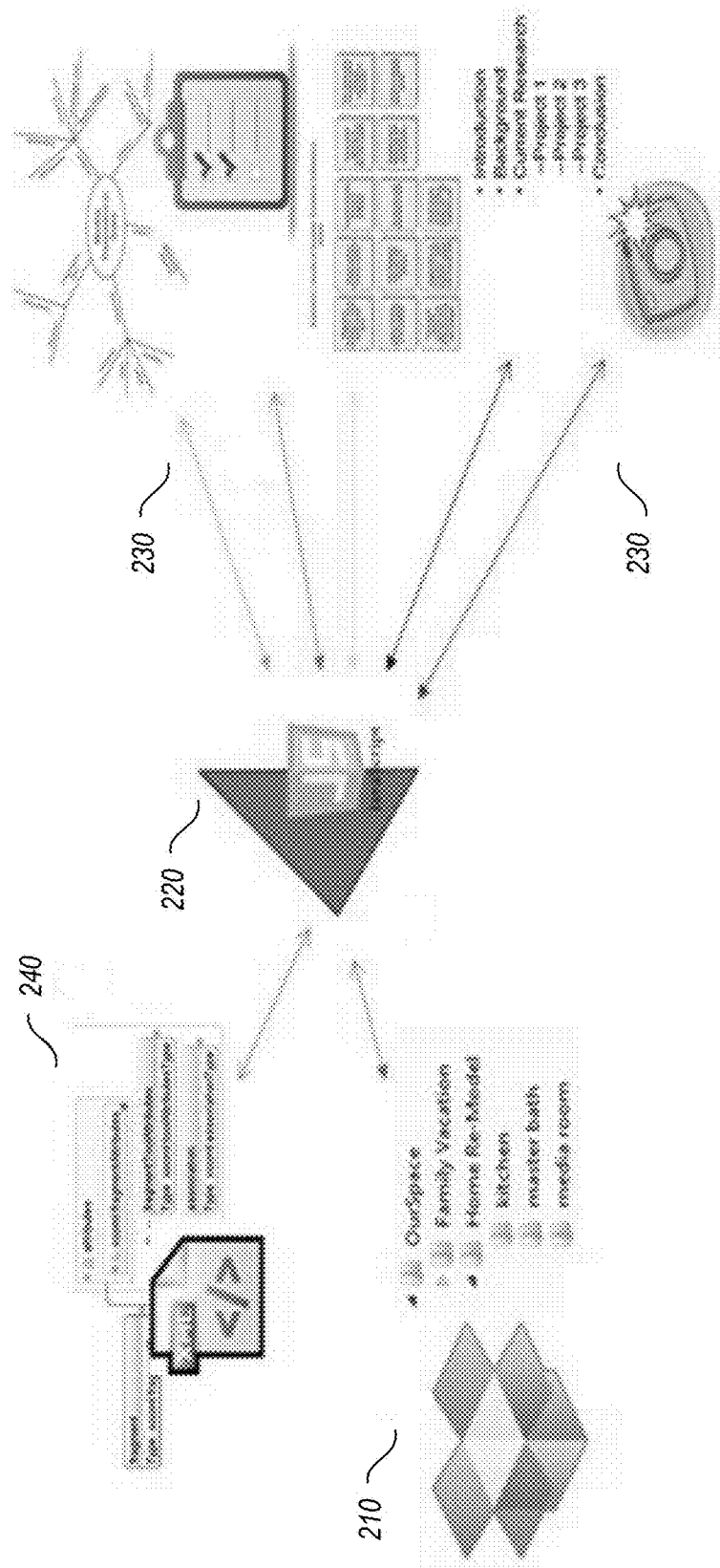
FIG. 2 illustrates one implementation of the itemMirror/XooML approach for representing the structure of user information across multiple information services in accordance with at least some of the techniques described herein.

FIG. 2 illustrates one implementation of the itemMirror/XooML approach for representing the structure of user information across multiple information services. In 210, the information itself is allowed to remain in "storing" apps and services such as Dropbox, Google Drive, Facebook, etc.). In 220, however, the structure of such information is modeled using itemMirror objects that support identical methods on the front end but operate on the back end using drivers specific to a given storing application and its API. Such drivers provide read/write access to information structures that are otherwise "siloed" in the storing application. In 230, other applications may operate partially or exclusively with itemMirror objects. In this manner, itemMirror supports the creation of applications that can provide complementary ways of working with the information structures. In 240 of the illustrated example, itemMirror objects persist their "mirrors" of structure in synchronized XML fragments according to a "XooML" schema that is both application-independent and also, using XML's namespace convention, application accommodating.

Figure 3:
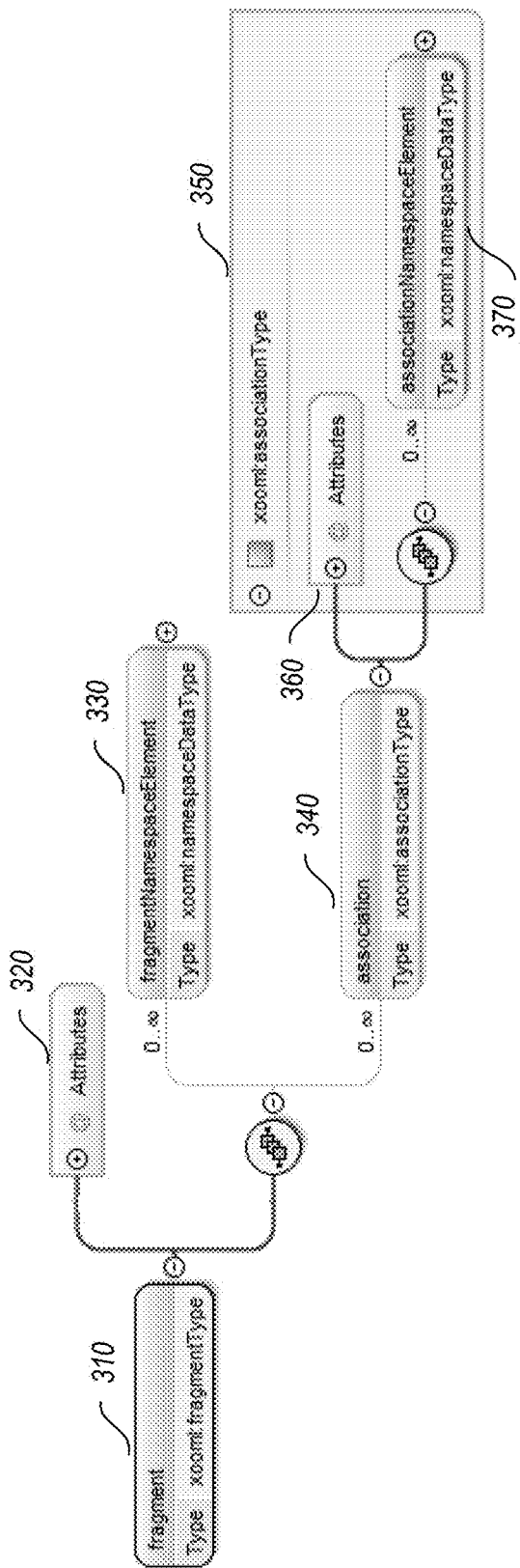
FIG. 3 depicts a representation of the structure of grouping item as a fragment (node) plus optional associations (links) in accordance with at least some of the techniques described herein.

FIG. 3 depicts a tool-independent representation of the structure of grouping item as a fragment (node) plus optional associations (links). In at least some implementations, a XooML fragment is a modular, tool-independent representation of a "noodle" (a node+outgoing links). Since nodes can link to other nodes (or even to themselves), fragments in aggregate can be seen to form a multidigraph (as described in the previous insert on XooML). A fragment, and each of its associations, can include any number of tool-accommodating namespace elements to store the data an application (or a collection of applications supporting a particular metadata standard) needs in order to give its special spin on the underlying structure. Additional details regarding XooML may be found in U.S. Publication No. 2011/0320927, which is hereby incorporated by reference in its entirety.

In the depicted example, a XooML fragment 310 includes an indication of tool-independent fragment attributes 320, a tool-accommodating fragmentNamespaceElement 330, and a single association/link 340. The association 340, in turn, is specified as having an association type 350, tool-independent fragment attributes 360, and an association-NamespaceElement 370. In addition, each element other than the attributes 320 and 360 include an indication of the element type. More generally, a fragment, representing the node-link structure of a grouping item, may in at least some implementations include:

tool-independent (fragment common) attributes;

zero or more tool-accommodating (fragment namespace) elements; and zero or more associations This pattern may partially repeat for each association, which similarly may include:

tool-independent (association common) attributes+ zero or more tool-accommodating (association namespace) elements

As seen above, therefore, the schema may support a representation of structure that is both tool-independent, such that a fragment (node) can have zero or more associations (links), and tool-accommodating, such that at both the fragment level and the level of each association, applications may store data specific to their work with the structure within namespace elements. The "tool-accommodating" extensions provided for in the XooML schema (as namespace elements) are designed to make it possible for any number of applications to work with the same structure. Moreover, application-specific namespace elements (at both the level of a fragment and at the level of an association) support information interaction that is dependent upon with the specific tools associated with the user. For example, a collection of applications might all work with the information in a namespace element. Applications self-described as supporting Dublin Core might each work with elements (at both the fragment and association levels) accordingly identified (e.g., xmlns:dc="http://purl.org/dc/elements/1.1/"). As another example, other tools might work with iCalendar namespace bundles (such as by indicating xmlns:ic="urn:ietf:params:xml:ns:icalendar-2.0"). Namespace elements may additionally contain information needed for an association or a fragment to work (appear and behave) as a task, an appointment, a bibliographic reference, etc. For example, an iCalendar attribute bundle could provide the necessary data for a fragment or an association to behave as an event (ic:vevent) or a "to-do" (ic:vtodo). Thus, the namespace bundle needed to make an association work in a special way (e.g., as a task, an appointment, a reference, etc.) may be placed at the level of the fragment as a whole. Namespace bundles can also be used in support of RDF (i.e. using namespaces with the following assignment: xmlns: rdf="http://www.w3.org/1999/02/22-rdf-syntax-ns#"). The grouping item mirrored might then serve to group together SPO triples pertaining to the same subject.

Namespace elements may in at least some implementations be uniquely identified via a URI (assigned as the value of the xmlns attribute. Using the data stored in namespace elements (as interpreted by the application), the grouping item (or any of its associations) can differentiate in in a manner analogous to stem cells, in order to assume the behavior of different informational item types (such as to-dos, appointments, contacts, references, etc.). In addition, The XooML approach to informational structural mirroring allows for an incremental approach in which integration may, for example, occur through the supported APIs of existing applications and through a gradual accumulation of tools built or retrofitted to "speak XooML". Typically, therefore, the source information group remains stored by the storing application or service regardless of what has been mirrored.

As indicated elsewhere herein, implementations may utilize other types of markup language to provide structural mirroring of information across multiple services. By way of certain examples and descriptions herein, a variation of XooML referenced as XooML2 is provided. By way of summary, XooML2 removes various item attributes supported in XooML, and additionally removes certain restrictions in the composition of namespace sub-elements. Such differentiation may allow implementations utilizing XooML2 to be more "tool-accommodating" and also in order to support the schemas of various metadata standards (e.g., Dublin Core). In addition, XooML2 may in certain implementations support:

Group use. XooML2 provides explicit mechanisms for the read and write of shared XooML fragments as done in the same timeframe but through different tools used by different people.

Relaxes restrictions on the nature of data an application can persist in namespace elements.

Multiple stores. XooML2 moves beyond specific stores as supported by Windows on the desktop or through Dropbox on the Web to a more general treatment of the stores supported by different applications (such as may be accessible through APIs, or in other manners). New attributes in the schema make provision for drivers that provide a consistent "face" to back-end interactions even as these vary greatly depending upon the store and its supporting application (e.g., Dropbox, Facebook, Evernote, etc.). General provision is made not only for variations in the store of grouping items but also for variations in the way corresponding XML fragments of metadata are stored.

A snapshot log for versioning and rollback of metadata fragments. Provision is made (e.g., in an optional "Extras" namespace sub-element of a fragment) for specification of a location and drivers for creation of context-stamped (time, place, person, etc.) "snapshots" of the metadata fragment. These can then provide the basis for rollback, recovery of view settings and, from an earlier rollback, a "play forward" to see a kind of time-lapse animation of the changes in grouping items (as may be displayed in the "document" constructed by a given XooML-speaking tool). Provisions for versioning and rollback may, in at least some implementations, preserve "snapshots" of a XooML fragment. Using these snapshots, it may be possible to rollback to earlier versions of a fragment or assemblage of fragments (such as by assembling such fragments into a document for viewing through a XooML-speaking tool).

An item event log for interactions with the grouping item. Separate provision is made (e.g., in an optional "Extras" namespace sub-element) for specification of a location and drivers to log interactions with the grouping item (e.g., folder, tag, "project", etc.) described by the metadata of a XooML fragment. An "item event log" may in some implementations store an interaction with the item as an event (an "item event") in two parts: the intent (e.g., the attempt to open, move, re-name, create, remove, etc.), and the effect (outcome), such as may indicate whether the attempt failed or succeeded.

Figure 4A:
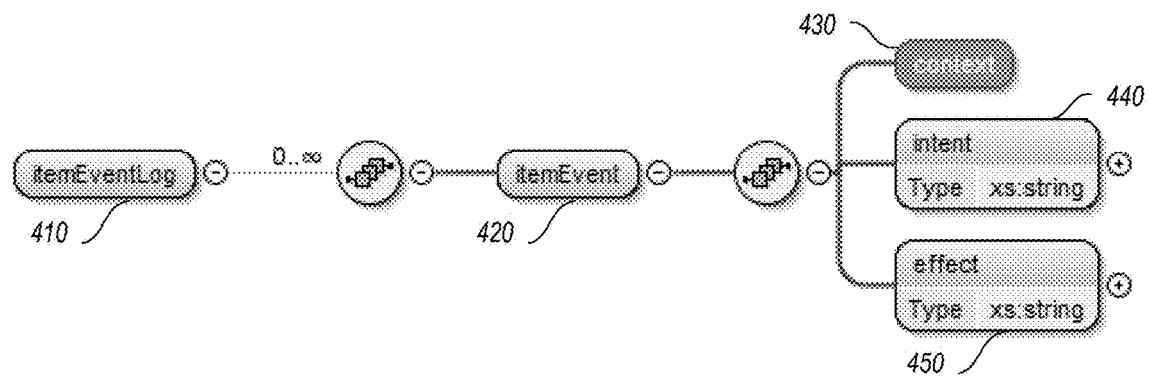
FIG. 4A depicts a possible schema for an item event log in accordance with the techniques described herein.

FIG. 4A depicts a possible schema for an item event log 410 in accordance with the techniques described herein. In at least certain implementations, the log is written to (using, e.g., itemEventLogWriteUtility) as a by-product of a tool's invocation of the itemDriver. The log may include zero or more itemEvents 420, each of which may include a context 430 (who?, when?, where?, with what tool?). The "what" of the item event is in two parts: the "intent" 440 is, in the illustrated example, a string encoding a File API request sent through the itemDriver via API to the application for the itemDescribed (e.g., Win32 if the itemDescribed is a Windows file folder). The "effect" 450 is a string encoding—also in the language of the FileAPI—the outcome of this request (including its success or failure).

Figure 4B:
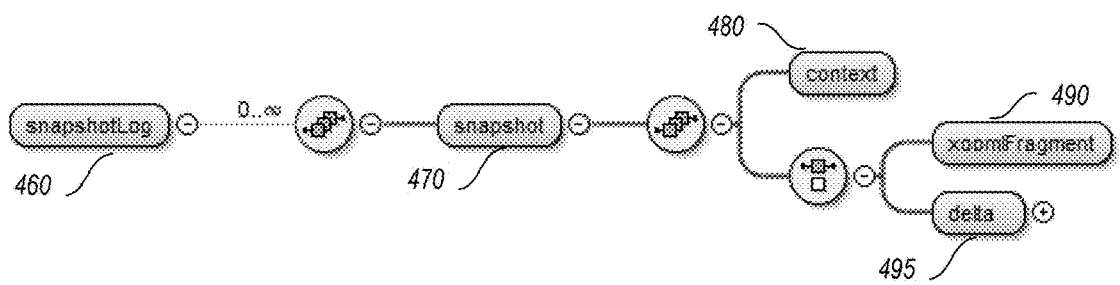
FIG. 4B depicts a possible schema for a snapshot log in accordance with the techniques described herein.

FIG. 4B depicts a possible schema for a snapshot log 460 in accordance with the techniques described herein. The log may include zero or more snapshots 470, with the illustrated example depicting only one. A snapshot, like an item event, is "stamped" with the context attributes 480. A snapshot is written via the snapshotLogWriteUtility called from the xoomlDriver. As with the item-event log, the determination over when and how often to take a snapshot is currently determined by snapshotLogWriteUtility. In certain implementations, the snapshot schema may make provision for attributes in the snapshot log to specify that a new snapshot is to be recorded with every successful write of the XooML fragment.

The structure of an snapshot may include a simple copy of the XooML fragment, and/or a "delta" representing the changes to be applied to a more recent fragment(n) in order to recover the state of a fragment(n−1) representing the fragment at the time that the snapshot is taken. Deltas can be computed in various manners. For example, a delta may comprise a computational difference between states of the fragment regarded as a plain text string; alternatively, a Delta may be expressed as a sequence of XPath expressions, such as to leverage the structure of XML for the purpose of computing a relevant delta. Deltas can be computed later "lazily" as needed in order to reduce the size of the log. Or, as the snapshotLogWriteUtility creates a new snapshot, it might replace the XooML fragment copy for the previous snapshot with a delta representing operations to be applied to the current fragment(n) to recover the previous fragment (n−1). As an example of using a snapshot log, the log may be inspected to recover view settings for a given user even if these have been overridden in the current fragment by another user's preferences. Thus, the snapshot log may provide an ability to rollback not only the state of the fragment (or a larger "document") but also to rollback to an earlier reality with respect to the actual information items.

Other changes in the schemas for XooML2 (relative to those of XooML) are described in greater detail elsewhere herein but may, in certain implementations, include:

- Eliminating many attributes or establishing such attributes in "extra" namespace elements for optional use. The attributes that remain may be renamed to be more descriptive of their use.
- Restrictions on the namespace sub-elements in earlier versions of the XooML schema precluded support for standards such as Dublin Core. XooML2 relaxes these restrictions so that a sub-element, as used by a specific tool or a class of tools (e.g., tools supporting Dublin Core or tools supporting iCalendar) may contain XML structures to support common metadata standards.
- Attributes pointing to drivers are added to promote consistency in the way grouping items are read and manipulated and in the way fragments are written to storage. Also, certain implementations may provide for a shared use of a synchronization driver, such as to insure that the metadata of a fragment remains consistent with the "reality" of the grouping item it is meant to describe.
- Additionally provides for optional inclusion of namespace elements—both at the level of a fragment and for each of its associations—that contain additional attributes in support of item event logging, versioning & rollback. The item event log and the snapshot log for a given fragment (describing a given grouping item) may be stored separately from the fragment, and may be stored according to separate XML schemas.

Additional information regarding XooML2 may be found in Application U.S. 61/900,876, which is hereby incorporated by reference in its entirety.

In at least certain implementations, itemMirror has both a front-end and a back-end and may be utilized as mediating software. For example, on the front-end, itemMirror "faces" developers and XooML-speaking applications with a simple itemMirror object model. On the backend, itemMirror is able to read and write changes back to the structure of various forms of grouping items via the APIs of storing applications and services. Interaction with the APIs of storing applications is through itemMirror drivers as specified through association-common attributes and described further elsewhere herein.

In certain implementations, an application may initiate a session with a user by instantiating an itemMirror object for a "seed" grouping item. Instantiation can happen either using a known XooML fragment for the grouping item or, if such a fragment is not available, by creating one.

Thereafter, an application utilizing itemMirror may instantiate additional itemMirror objects recursively for each link of the grouping item under consideration according to service- or application-specific settings from a previous session with the user. For example, an application may initiate expansion of various groupings in order to reconstruct the state of the outline view from a previous session—where each heading/subheading of an outline may correspond to a different folder/subfolder (as the grouping item). Such expansion may be driven, for example, by an "isCollapsed" attribute in the namespace element for each association of the relevant grouping item.

Methods of an itemMirror object may, in at least some implementations, provide support for at least the following non-exclusive functionality as front-end operations:

- List associations.
- Create an association.
- Delete an association.
- Save—i.e. save the XooML fragment back to its file.
- Sync—synchronize to insure that the XooML fragment accurately reflects the structure of the grouping item it is mirroring. (In cases of conflict, the grouping item wins).
- Create namespace element—the application provides a namespace URI as an argument. Elements can be created at both the fragment level and for each of a fragment's associations.
- Delete namespace element.
- Get and set of common attributes—both at the level of the fragment and for each of its associations.
- Get/set namespace element.

Thus, an application, developed once, may operate effectively regardless of the particular storing application or information service—whether Dropbox, Google Drive, SkyDrive, Box or, even, some applications that we don't' think of us as "storing" (e.g. Facebook).

In certain implementations, uniform support across multiple storing applications and services is provided via tool-specific drivers on the "back end." Such drivers may include association-level attributes, specified in the XooML, that point to the code needed to read the structure of a grouping item, its mirroring XooML fragment and to handle the logic of synchronization between grouping item and fragment:

- itemDriver
- xoomlDriver
- syncDriver

By working with itemMirror objects—one, for example, per Dropbox folder—developers of itemMirror applications may focus on the "front end" and the user experience, while JavaScript drivers accessed through the itemMirror objects may operate directly with Dropbox to ensure that separate itemMirror applications operate well with each other. Each application may utilize the same folder hierarchies as shared through Dropbox, but may provide disparate manners of presentation. For example, various applications using itemMirror may present identical information groups as a mind map, an outline, a series or other collection of notes, one or more lists, an image collage, etc.

Consider a general use example of XooML2, such that fragment-level attributes specify the following:

- xoomlDriver (shortened to "Write Fragment"), a URI pointing to a driver for writing (and also reading) a XooML fragment (as referenced through a URI). This driver makes use of and is specific to the API supported by a storage management facility like Dropbox or Windows. The driver takes as input a string for the XooML fragment together with a URI pointing to the storage location for the fragment. The driver outputs either "success" or, on failure, a string representing the fragment as just retrieved. The driver can optionally call the snapshotLogWriteUtility to save a version of the fragment (e.g., as it was in storage before the write).
- itemDriver (shortened to "Work w Item"), a URI pointing to a driver that uses the API of a storage management facility in order to read and make changes to the itemDescribed by a XooML fragment. Operations supported are more fine-tuned than for Write Fragment. To use the example of a folder as the itemDescribed, the driver needs to support an ability to "List" the folder's contents and to add/delete from these contents (e.g., add/delete a subfolder, shortcut or other file). The driver takes as input a File API expression of intent (i.e. what is to be done with the item described). The driver returns the "effect" of this request (also a File API expression). The driver can, optionally, call the itemEventLogWriteUtility in order to log the interaction with the itemDescribed (as intent and effect).

syncDriver (shortened to "Synchronize"), a URI pointing to a driver that compares a listing of contents for a itemDescribed (as delivered by Work w Item) with comparable content (associations) in a XooML fragment. The driver takes as input a string representing the XooML fragment. The driver returns a XooML string modified to bring its content in line with the content of the itemDescribed or null, if no changes were necessary. The synchronization driver speaks the File API in is interactions with Work w Item.

GUIDgeneratedOnLastWrite. This attribute is re-set for a XooML fragment with each write attempt. A XooML-speaking tool reads this attribute along with the rest of the XooML fragment. Immediately prior to any write attempt, the tool reads the fragment again to verify that the GUID value for the attribute is the same Consider a situation where Tool T, as used by person P, reads a set of XooML fragments in order to construct a "document" view (where, depending upon tool T, the view may appear as an outline, as stacks in a bulletin board, as a mind map, or some other form). Call this case A.

Any given tool T will work with a StackOfURIsToXooMLFragmentsToRender. Initially the stack will have a single URI pointing to a single XooML fragment. A possible sequence of operations in case A is as follows:

1. Pop the StackOfURIsToXooMLFragmentsToRender. If empty, stop.
2. Otherwise, resolve the URI to a string for XooML fragment F. Note the value of the GUIDgeneratedOnLastWrite. Call this G(read).
3. Use syncDriver (which in turn works with itemDriver) to determine a list of changes that need to be made to fragment F in order to bring its data (e.g., display name, associations) into agreement with those of the itemDescribed.
4. Make these changes to fragment F (as a string kept by the XooML-speaking tool).
5. Using Write Fragment with G(read) as an argument, attempt to write fragment F back to the XooML fragment store. The driver will fail (and return an error, raise an exception) if the "current" GUIDgeneratedOnLastWrite—call this G(write)—does not equal G(read). If not equal, then go back to step 2. If equal (success!) then continue to step 6.
6. For each association in Fragment F, inspect tool-specific attributes to determine whether its associatedXooMLFragment should also be rendered in the current view (document) 1. For Planz this means looking to see if the isCollapsed attribute is FALSE. If so, then add the URI value of its associatedXooMLFragment to the StackOfURIsToXooMLFragmentsToRender.
7. Return to step #1.

Now consider variations of a case B where tool T has already rendered a set of fragments for the current view which is now being used by person P. What happens as these fragments are also being viewed and possibly modified by another person Q through tool U? In one example of case B, Person P sees a folder F in an application as a heading H, which is currently collapsed. The click to expand is really simply a special case of A—the initial generation of a view. In this variation, the URI for the associatedXooML fragment is pushed onto the StackOfURIsToXooMLFragmentsToRender and then steps #1 through #7 above are followed as before.

In another variation of Case B, consider a user wishing to work with the contents of an item (e.g., open, create, or delete a child item). Note that Sync(hronize) and a Save (i.e., write) Fragment (as needed) may happen both before and after the Work w Item. The heading H for folder F is already expanded and associations from the synchronized fragment for folder F are in view. Suppose that in the relevant application, these appear as notes (for files) and subheadings (for subfolders). The region rendered for a fragment is called a Plan. Person P may wish to do something with this Plan and its associations. For example, person P may wish to open the item pointed to by an association into a separate application. Person P may wish to delete an association and the item to which it points. But first, it should be established that the region as rendered (the Plan) is still current. Verification may be implemented as follows:

8. Upon a shift of focus (e.g., as communicated by click or hover) to the region defined by the XooML fragment, the sequence of steps under Case A above are followed first to insure that the tool's copy of the fragment is still current (i.e., that it has not been superseded by a more recent write of the fragment and that it is still consistent with the itemDescribed). If the fragment is to be updated then the region in view is re-rendered.
9. The requested action (open, create, rename, delete, etc.) is handled through the Work w Item. The request is optionally logged as an intent in the fragment's associated item-event log. The effect Outcome) of the request, whether failure or success, is also logged. (See description of logs in the "Extras" section above.) On failure, raise an error for the person P to see (e.g., "Cannot delete, file still in use . . . ") and stop. With success, continue to next step.
10. The sequence of Case A above is then followed a second time, such as to determine what changes if any must be made to the fragment as a result of the operations to the content of the itemDescribed.

As a separate and additional example, consider an itemMirror application "Scroll," intended to provide integrated "stories" containing information that may be useful to a user, but not instantly relevant. For example, various information groups taking various forms such as emails, tweets, posts, Web pages returned by a search, photos taken or received, and also as thoughts we have (whether great ideas for a project or a remembered "to-do" to pick up the dry cleaning) Scroll is a "XooML-speaking" HTML5 application able to work with itemMirror drivers across various storing applications (e.g., Dropbox, Google Drive, Box, SkyDrive, etc.) that provides WYSIWYG multi-media editing for on-line publishing. Such WYSIWYG editing may include, for example, "Web Layout" and "Outline" views. The application additionally utilizes full-text searching to provide linking from displayed information to folders representing the people (characters), places (settings), plots (including projects or "quests"), conflicts and resolutions of our life stories. Scroll may in certain implementations, for example, be provided as a Web browser plug-in and/or as a stand-alone desktop application.

In at least some implementations, Scroll:

Prevents fragmentation of information into a series of "notes'.

Integrates information into stories that people can smoothly "scroll" through from start to finish.

Prevents tool-specific constructs (e.g., the "notebooks" and "tags" of Evernote or the "pages" and "section tabs" of OneNote).

Instead, information may be structured by ordinary folders (such as those that may be recognized across desktop operating systems and easily shared, synced and saved via storing applications). Folders, in at least one implementation, serve as both a repository for files (documents, photos, videos, emails, etc.) and a manner in which non-local information (Web pages, files and folders located elsewhere) may be tagged.

The Scroll application displays each folder as its own story, an entry point into a larger story, or both. The links, files and folders within a folder can be woven together into a complete whole. Share your stories for collective work with others via the sharing mechanism of the storing application. Or selectively share some of your stories with the whole world, such as via a URL manufactured to point to a folder's XooML fragment. Additional information related to the Scroll application may be found in Application U.S. 61/933,740, which is hereby incorporated by reference in its entirety.

As utilized herein, a computer-implemented method for presenting aggregated user information may be summarized as including: providing, by one or more configured computing systems and to each of one or more remote information services, an indication of authorization by a user for the one or more configured computing systems to access the remote information service on behalf of the user; receiving, by the one or more configured computing systems and from each of at least two distinct data sources, one or more information groups associated with the user, wherein one of the at least two data sources is one of the remote information services, and wherein the one or more information groups from the one remote information service are provided by the one remote information service based at least in part on the indicated authorization; generating, by the one or more configured computing systems and for each of the received information groups, a data structure representing the information group, each of the generated data structures including a tool-independent portion and a tool-dependent portion, the tool-dependent portion of each generated data structure corresponding to the data source from which the represented information group is received; concurrently displaying, by the one or more configured computing systems and based at least in part on at least some of the generated data structures, an indication to the user of two or more of the information groups.

Generating the data structures may include generating at least one data structure that represents an information group stored by an application on a client device of the user. At least one of the information groups may include one or more of a group that includes an image and an electronic message of the user. At least one of the information groups may include one or more links to additional information groups, and the generated data structure representing the at least one information group may include one or more elements representing each of the one or more links. At least one of the generated data structures may include a specification of one or more snapshot versions of the at least one generated data structure, each of the one or more snapshot versions being specified by one or more of a location of the snapshot version and a driver associated with the snapshot version. Providing the indication of the authorization to the one remote information service may include providing the indication via a programmatic interface of the one remote information service, and receiving the one or more information groups from the one remote information service may include receiving the one or more information groups via the programmatic interface.

The computer-implemented method for presenting aggregated user information may further include receiving an indication of a selection by the user of at least one of the received information groups, wherein the at least one selected information group may include links to at least some of the information groups other than the at least one selected information group, and wherein the receiving of the other information groups may be based at least in part on the one or more links of the at least one selected information group.

The displayed information groups may be received from the one remote information service, and the method may further include: receiving a request from the user for one or more modifications to one of the displayed information groups and, based at least in part on the received indication: modifying the one displayed information group; generating an updated data structure representing the modified information group; and providing, based at least in part on the indicated authorization, an indication of the modified information group to the one remote information service. The one or more configured computing systems may be located remotely from the user, and concurrently displaying the indication to the user of the two or more information groups may include causing a remote client device of the user to concurrently display the two or more information groups. The one or more configured computing systems may include a client device of the user, and the generating of the data structures representing the received information groups may be performed by an application executing on the client device.

Also as used herein, a non-transitory computer-readable medium may have stored contents that configure a computing device to perform a method that includes: providing, by the configured computing device and to a remote information service, an indication from a user of authorization to access the remote information service on behalf of the user; receiving, by the configured computing device and from each of multiple distinct data sources, one or more information groups associated with the user, wherein one of the multiple data sources is the remote information service, and wherein the one or more information groups from the one remote information service are provided by the one remote information service based at least in part on the indicated authorization; generating, by the configured computing device and for each of the received information groups, a data structure representing the information group, at least some of the generated data structures including a tool-independent portion and a tool-dependent portion, the tool-dependent portion of each of the at least some generated data structures corresponding to an information type of the represented information group; and causing, by the configured computing system and based at least in part on the generated data structures, a presentation device to concurrently display multiple of the information groups to the user.

Generating the data structures may include generating at least one data structure that represents an information group stored on the presentation device. Causing the presentation device to concurrently display multiple of the information groups to the user may include causing a first application executing on the presentation device to concurrently display the multiple information groups in a first manner, and the stored contents may further configure the computing device to cause a distinct second application executing on the presentation device to concurrently display, based at least in part on the generated data structures, a plurality of the received information groups in a distinct second manner. At least one of the information groups may include one or more links to additional information groups, and the generated data structure representing the at least one information group may include an indication of each of the one or more links. At least one of the generated data structures may specify one or more snapshot versions of the at least one generated data structure, each of the one or more snapshot versions being specified by at least one of a location of the snapshot version and a driver associated with the snapshot version. At least one of the generated data structures may include an indication of one or more events related to the at least one generated data structure. Receiving the one or more information groups from the remote information service may include receiving the one or more information groups via a programmatic interface of the remote information service.

The non-transitory computer-readable medium having stored contents that configure a computing device to perform a method may further include receiving an indication of a selection by the user of at least one information group, the at least one selected information group including links associated with at least some of the information groups other than the at least one selected information group, and wherein the receiving of the other information groups may be based at least in part on the associated links of the at least one selected information group.

One of the displayed information groups may be received from the one remote information service, and the stored contents may further configure the computing device to receive a request from the user for one or more modifications to one of the displayed information groups and, based at least in part on the requested modifications, may generate an updated data structure representing a modified version of the information group; and may provide a request to the remote information service to store the modified version of the information group. The configured computing device may be a client device of the user, and the method may be performed by an application executing on the client device.

The following provides additional details regarding examples of specific implementations for attributes of item-Mirror objects and/or associations using XooML and/or XooML2 schema.

Additional XooML2 Examples

The attributes described below may be packaged into namespace elements, and may be used both for the fragment as a whole and each of its associations. Namespace elements at each level may be identified by the namespace declaration: xmlns:xooml-extras=http://kftf.ischool.washington.edu/xmlns/xooml-extras.

Note: A context type is defined and instantiated in several places within the "Extras" schemas and also the schemas for item event and snapshot logging. Context encapsulates attributes with the following names: who (a URI identifying the user associated with an event), when, where (GPS coordinates) and withWhatTool (a URI specifying which tool was in use). In descriptions that follow, we will simply refer to these as the "context attributes".

We'll consider first the Extras at the association level and then the Extras at the fragment level. Then we'll consider the structure of the two logs: the item-event log and the snapshot log.

Association Extras:
firstCreated is an element that includes the context attributes and, as its name implies, records the circumstances of an association's creation. Note that there is no complementary provision for a "lastModified" since this information can be recorded in the logs.

itemDescribedByAssociatedXooMLFragment is an element with attributes to cache useful data concerning the information item pointed to by an association. This data is derived from other sources and care should be taken to insure that the data agrees with the data from these sources. The following attributes are present:
   itemAddress—a URI that should agree with the URI of the itemDescribed attribute in the fragment pointed to by the associatedXooMLFragment of the association.
   itemApplicationToOpen—a URI pointing a default application to be used to open the item.
   itemIcon. To be used in the display of the association and its associated item.
   itemPop-upText—text to display upon a hover over the icon for the associated item.
   signatureForItemDescribedByAssociatedXooMLFragment (optional)—used by synchronization driver to repair a broken link? (i.e., in cases where item described cannot be found?

Fragment Extras
   Extras at the fragment level include:
   firstCreated and lastWritten elements. Both include the context attributes. lastWritten context attributes are given new values with each successful use of the xoomlDriver. firstCreated context attributes are given values upon initial creation of the fragment (which may not necessarily coincide with the creation of the itemDescribed).
   displayName—a text string to be used in representations of the itemDescribed of the fragment (e.g., the title of the display window for the fragment and its itemDescribed).
   itemEventLog—an element packaging the following attributes:
       itemEventLogLocation—a URI pointing to the base file or record of the log.
       itemEventLogWriteUtility—a URI pointing to the driver that writes out a new event.
       itemEventLogReadUtility—URI pointing to the driver that reads the item event log.
   The structure of the item-event log is described in the next sub-section. Here we note that the writing of a new event to the log may be a simpler operation than reading the log. New item events can simply be appended to the log or even written in a separate file or record to be appended to the source log later. Even if item events happen to be written out of order with respect to their occurrence, a temporal ordering can be established later: Item events each carry the context attributes.
   Reading from the log is a very different operation. Parameters for the read driver are not for us to specify here but even basic operations like "list all events of the past week" require that the driver be able to read the entire log—merging log fragments, as needed.
   snapshotLog—an element packaging the following attributes:
       snapshotLogLocation—a URI pointing to the base file or record of the log.
       snapshotLogWriteUtility—a URI pointing to the driver that saves a current snapshot of the XooML fragment.
       snapshotLogRollbackUtility—URI pointing to the driver that returns a version of the XooML fragment as it existed at or near a specified point in time.
   As with the item event log, writing to the snapshot log can be a simple append with a new ancillary file or record started as needed should the log itself be locked. Snapshots are stamped for time by their context attributes and so temporal ordering can be recovered later as needed. As will become clearer in the sub-section describing the schema for the snapshot log, snapshots can be represented by a simple copy of the XooML fragment. Later, to save space, this copy might be replaced by a "delta" offset computed—directly or indirectly—from the XooML fragment in its current state.

In contrast to the write driver and in line with the read driver for the item event log, the operations of the snapshotLogRollbackUtility are more intricate. Again, parameters of this driver are not for us to specify here but certainly most operations require a read of the entire log. The rollback to the fragment at a previous point in time may require the application of a succession of deltas staring with the fragment in its current state (e.g., fragment(n)) and recovering a succession of earlier states (fragment(n−1), fragment (n−2), etc.) until the state at or "near" the desired time point is reached. We will examine the design used by NoSQL data stores, such as Apache Cassandra, to update their own write logs to see if such designs can be reused by whatever driver eventually implements XooML2's logging functionality. But the larger point is that the selection of a driver is open.

Note that logs relating to a XooML fragment and its itemDescribed are kept separate from the fragment for the simple reason that logs, unless trimmed, grow ever larger and would impose an ever greater time penalty if stored in the fragment itself. The size of a fragment does not necessarily get larger with the simple passage of time. It should grow larger (or smaller) in accordance with the size of its itemDescribed and also grows larger according to the number of tools used to work with the itemDescribed.

Fragment common data attributes, including those for the drivers, are described in greater detail below, along with a description of the association common data attributes.

Attributes for fragmentCommonData:

schemaVersion. The current version of the XooML schema in effect for the fragment.

itemDescribed. A URI pointing to the item described by the fragment or metadata of a fragment. A URI might point to just about anything that can be interpreted as a grouping item. For example: a conventional file system folder, a "tag" as supported by any of several applications, or an application-specific construct such as a "notebook" in Evernote, a section tab in OneNote or an "album" in Facebook. Even the term of an index built through an indexing utility (e.g., Lucene) can be interpreted as a grouping item (i.e., it is addressable and, in turn, may directly address documents in which it was found as content). Note: A XooML fragment is metadata for an item. But this item may not exist as a thing to be returned through the resolution of a URI. The item might be a mental list of "things to do over the weekend".

itemDriver. Different drivers are needed for different item stores (as supported through different interfaces). To work with (list, open, move, delete, create, re-name, etc.) a Windows file system folder, for example, we need a driver that can "speak" Win32. To work with the grouping items of Evernote, we need a driver that works through the Evernote Cloud API. To work with the grouping items supported through Facebook, we need a driver that works with the Graph API. And so on . . . . Utilities, though necessarily diverse on the backend, might all themselves support a common interface for use across XooML-speaking tools such as the File API (http://www.w3.org/TR/FileAPI/).

syncDriver. This driver compares the data returned for the itemDescribed (through use of itemDriver) with corresponding metadata of the fragment. In particular, the synchronization driver compares the listing of contents for a grouping item with the listing of associations for a fragment. The driver outputs a modified fragment that is in alignment with the "reality" of the itemDescribed. (In cases of conflict, the itemDescribed always wins). This fragment is then saved to the store for the XooML fragment (see next attribute).

Note that this attribute, by specifying a synchronization driver, provides a more general replacement of the "levelOfSynchronization" attribute in earlier versions of XooML. There are many models of synchronization and these do not neatly align on an ordinal scale.

xoomlDriver. Just as the itemDescribed may come from many different stores, so too the XooML fragment that describes this grouping item may be saved in different ways. When file system folders are the grouping items to be described, it has worked well (e.g., in Planz and QuickCapture) to save a folder's XooML fragment simply as a file ("xooml.xml") within the folder. Even as the folder is renamed or moved, the fragment remains. But for grouping items from other stores supported by other applications, such a solution won't always work. In some cases, for example, the user (and the tool he/she is using) may not have write access to the store of a grouping item. Other solutions include the use of a database (e.g., MySQL). In general, it is possible that the store for XooML fragments is managed very differently than the store(s) for grouping items.

GUIDgeneratedOnLastWrite. This is re-set for a XooML fragment with each successful write. A XooML-speaking tool reads this attribute along with the rest of the XooML fragment. Immediately prior to any write attempt, the tool reads the fragment again to verify that the GUID value for the attribute is the same. If so, then it "knows" that the XooML fragment it last read is still the last one to be written. It can proceed with a write. On the other hand, if the GUIDs don't match then a newer version of the fragment has been saved (by another user through another XooML tool). The tool should read and work with this newer version of the fragment. Any eventual changes made and written out must be made through this newer version. Note: The use of attributes to specify drivers is optional but strongly recommended. These specify common drivers for consistency in the handling of fragments, items and the synchronization between these. If a driver attribute has a valid non-null value (pointing to an operational driver) then all XooML-speaking tools that work with the fragment are expected to use the specified driver.

Attributes for associationCommonData

ID. Each association element is uniquely identified through a GUID.

displayName. Each association optionally has a string of text that can be used to represent and describe the association in displays. (Associations can also optionally have a display icon through the "Extras" namespace sub-element. See below.) Though displayName is optional, its use is strongly recommended. If displayName is non-null, XooML-speaking tools are expected to find a way to show this name in their renderings of an association.

associatedXooMLFragment. An association can optionally point, though this attribute's URI value, to another XooML fragment describing another (grouping) item.

The following provides an example of an itemMirror class description, including a constructor, parameters, methods, etc.

ItemMirror Class

Defined in: scripts/ItemMirror.js:1

ItemMirror represents an Item according to the XooML2 specification.

It can be instantiated using one of the following two cases based on the given arguments.

XooMLFragment already exists. Given xooMLFragmentURI and xooMLDriver.

The XooMLFragment is created from an existing groupingItemURI. Given a groupingItemURI, saveLocationURI. Optionally a itemDriver, syncDriver, and a xooMLDriver can be supplied for the XooMLFragment.

Try case 1, and then fallback on case 2.
Throws NullArgumentException when options is null.
Throws MissingParameterException when options is not null and a required argument is missing.
Constructor ItemMirror
(
options
callback
)

Defined in scripts/ItemMirror.js:1
Parameters:
  options Object
    Data to construct a new ItemMirror with
      groupingItemURI String
        URI to the grouping item. Required for all cases.
      itemDriver String
        Data for the ItemDriver to construct ItemMirror with. Required for all cases. Can contain any amount of optional key/value pairs for the various Driver implementations.
          driverURI String
            URI of the driver.
      xooMLDriver String
        Data for the XooMLDriver to construct ItemMirror with. Required for all cases. Can contain any amount of optional key/value pairs for the various Driver implementations.
          driverURI String
            URI of the driver.
      syncDriver String
        Data for the SyncDriver to construct ItemMirror with. Required Case 2 & 3. Can contain any amount of optional key/value pairs for the various Driver implementations.
          driverURI String
            URI of the driver.
      readIfExists Boolean
        True if ItemMirror should create an ItemMirror if it does not exist, else false. Required for Case 2 & 3.
      parent ItemMirror
        Parent ItemMirror of the ItemMirror to be constructed. Optional.
  callback Function
    Function to execute once finished.
      error Object
        Null if no error has occurred in executing this function, else an contains an object with the error that occurred.
      itemMirror ItemMirror
        Newly constructed ItemMirror
Index
Methods
Item Index
Methods
  _checkExistenceFromItemDescribed
  _createAssociationGroupingItem
  _createAssociationLinkGrouping
  _createAssociationLinkGrouping
  _createAssociationLinkNonGrouping
  _createAssociationNonGroupingItem
  _createAssociationSimple
  _createNonGroupingItemFromItemDescribed
  _createSyncDriver
  _createXooMLFragment
  _getItemU
  _getItemUForFallbackConstructor
  _getItemUNewXooMLFragment
  _handleDataWrapperCopyAssociation
  _handleDataWrapperDeleteAssociation
  _handleDataWrapperMoveAssociation
  _handleDataWrapperRenameAssociation
  _handleExistingAssociationCopy
  _handleExistingAssociationDelete
  _handleExistingAssociationMove
  _handleExistingAssociationRename
  _isCurrent
  _isURL
  _loadXooMLFragmentString
  _removeGroupingItemThroughAssociation
  _removeNonGroupingItemThroughAssociation
  _save
  _saveAssociationAssociatedXooMLFragment
  _saveFragment
  _setAssociationLocalItemAndAssociatedItem
  addAssociationNamespaceAttribute
  addFragmentNamespaceAttribute
  createAssociation
  createItemMirrorForAssociatedGroupingItem
  deleteAssociation
  duplicateAssociation
  getAssociatedItemOfAssociation
  getAssociationDisplayText
  getAssociationLocalItemName
  getAssociationNamespaceAttribute
  getAssociationNamespaceData
  getDisplayName
  getFragmentNamespaceAttribute
  getFragmentNamespaceData
  getGUIDGeneratedOnLastWrite
  getItemDescribed
  getItemDriver
  getItemList
  getItemMirrorFromWhichThisWasCreated
  getParent
  getSchemaLocation
  getSchemaVersion
  getSyncDriver
  getXooMLDriver
  hasAssociationNamespace
  hasFragmentNamespace
  isAssociatedItemGrouping
  isGroupingItem
  listAssociationNamespaceAttributes
  listAssociations
  listFragmentNamespaceAttributes
  moveAssociation
  refresh
  removeAssociationNamespaceAttribute
  removeFragmentNamespaceAttribute
  renameLocalItemOfAssociation
  setAssociationDisplayText
  setAssociationNamespaceAttribute
  setAssociationNamespaceData
  setFragmentNamespaceAttribute
  setFragmentNamespaceData
  sync
  toString
  upgradeAssociation Methods ---
_checkExistenceFromItemDescribed
(
   itemName
   callback
)

--- private
Defined in scripts/ItemMirror.js:2043
Checks to see whether the given item exists based on the name provided.
Parameters:
  itemName String
  callback Function
  error Object
    Null if no error has occurred in executing this function, else an contains an object with the error that occurred.

---
_createAssociationGroupingItem
(
   GUID
   options
   callback
)

--- private
Defined in scripts/ItemMirror.js:1933
Creates an association grouping item and then saves that association
Parameters:
  GUID String
  options Object
  callback Function
  error Object
    Null if no error has occurred in executing this function, else an contains an object with the error that occurred.

---
_createAssociationLinkGrouping
(
   GUID
   options
   callback
)

--- private
Defined in scripts/ItemMirror.js:1887
Takes care of cases 4 and 5. Neither are implemented.
Parameters:
  GUID String
  options Object
  callback Function
  error Object
    Null if no error has occurred in executing this function, else an contains an object with the error that occurred.

---
_createAssociationLinkGrouping
(
   GUID
   options
   callback
)

--- private
Defined in scripts/ItemMirror.js:1911
Takes care of cases 6 and 7.
Parameters:
  GUID String
  options Object
  callback Function
  error Object
    Null if no error has occurred in executing this function, else an contains an object with the error that occurred.

---
_createAssociationLinkNonGrouping
(
   GUID
   options
   callback
)

--- private
Defined in scripts/ItemMirror.js:1861
Takes care of cases 2 and 3. Only case 2 appears to be implemented.
Parameters:
  GUID String
  options Object
  callback Function
  error Object
    Null if no error has occurred in executing this function, else an contains an object with the error that occurred.

---
_createAssociationNonGroupingItem
(
   GUID
   options
   callback
)

--- private
Defined in scripts/ItemMirror.js:1986
Creates an association non grouping item and saves it.
Parameters:
  GUID String
  options Object
  callback Function
  error Object
    Null if no error has occurred in executing this function, else an contains an object with the error that occurred.

---
_createAssociationSimple
(
   GUID
   options
   callback
)

--- private
Defined in scripts/ItemMirror.js:1840
Takes care of case 1.
Parameters:
  GUID String
  options Object
  callback Function
  error Object

```
_createNonGroupingItemFromItemDescribed
(
    GUID
    options
    callback
)
``` private
Defined in scripts/ItemMirror.js:2014
Creates an association non grouping item based off of the name specified in options and saves it.
Parameters:
   GUID String
   options Object
   callback Function
   error Object
      Null if no error has occurred in executing this function, else an contains an object with the error that occurred.
_createSyncDriver
( ) private
Defined in scripts/ItemMirror.js:1506
Creates a sync driver
Returns:
The sync driver

```
_createXooMLFragment
(
    options
    list
    callback
)
``` private
Defined in scripts/ItemMirror.js:1584
Given a list of associations this will create a new XooML-Fragment with all of the associations in the given list. The fragment will also be saved.
Parameters:
   options Object
   list String[ ]
   Associations
   callback Function
   error Object
      Null if no error has occurred in executing this function, else an contains an object with the error that occurred.

```
_getItemU
(
    xooMLFragmentURI
    options
    callback
)
``` private
Defined in scripts/itemMirror.js:1471
Sets the item driver specified in the options for the XooM-LFragment.
Parameters:
   xooMLFragmentURI String
   options Object
   callback Function
   error Object
      Null if no error has occurred in executing this function, else an contains an object with the error that occurred.

```
_getItemUForFallbackConstructor
(
    xooMLFragmentURI
    options
    callback
)
``` private
Defined in scripts/ItemMirror.js:1787
Retrieves a fallback constructor for XooML Driver
Parameters:
   xooMLFragmentURI String
   options Object
   callback Function
   error Object
      Null if no error has occurred in executing this function, else an contains an object with the error that occurred.

```
_getItemUNewXooMLFragment
(
    xooMLFragmentURI
    options
    callback
)
``` private
Defined in scripts/ItemMirror.js:1811
Creates new XooML Fragment for an already existing item. For instance, in dropbox's case, it would look at a folder, and then create a new fragment, with the associations being all of the items in that folder.
Parameters:
   xooMLFragmentURI String
   options Object
   callback Function
   error Object
      Null if no error has occurred in executing this function, else an contains an object with the error that occurred.

```
_handleDataWrapperCopyAssociation
(
    GUID
    localItem
    itemMirror
    error
    callback
)
``` private
Defined in scripts/ItemMirror.js:2106
Purpose unknown
Parameters:
   GUID String
   localItem String
   itemMirror Object
   error Object
   callback Function
   error Object
      Null if no error has occurred in executing this function, else an contains an object with the error that occurred.

```
_handleDataWrapperDeleteAssociation
(
    GUID
    localItem
    error
    callback
)
``` private
Defined in scripts/ItemMirror.js:2069
Helps to handle whether associations should be deleted. Not entirely sure about the utility of this function, it looks like something that should be handled by the sync driver.
Parameters:
   GUID String
   localItem String
   error Object
   callback Function
   error Object
      Null if no error has occurred in executing this function, else an contains an object with the error that occurred.

```
_handleDataWrapperMoveAssociation
(
    GUID
    localItem
    itemMirror
    error
    callback
)
``` private
Defined in scripts/ItemMirror.js:2142
Purpose unknown
Parameters:
   GUID String
   localItem String
   itemMirror Object
   error Object
   callback Function
   error Object
      Null if no error has occurred in executing this function, else an contains an object with the error that occurred.

```
_handleDataWrapperRenameAssociation
(
    GUID
    localItem
    itemMirror
    error
    callback
)
``` private
Defined in scripts/ItemMirror.js:2178
Purpose unknown
Parameters:
   GUID String
   localItem String
   itemMirror Object
   error Object
   callback Function
   error Object
      Null if no error has occurred in executing this function, else an contains an object with the error that occurred.

```
_handleExistingAssociationCopy
(
    GUID
    item
    ItemMirror
    callback
)
``` private
Defined in scripts/ItemMirror.js:1651
TODO: Document. Purpose and usage unknown as of Jul. 3, 2014
Parameters:
   GUID String
   item String
   ItemMirror Object
   callback Function
   error Object
      Null if no error has occurred in executing this function, else an contains an object with the error that occurred.

```
_handleExistingAssociationDelete
(
    GUID
    item
    callback
)
``` private
Defined in scripts/ItemMirror.js:1620
Given an association, this will delete the association, whether it's a grouping item or isn't. The item is then saved.
Parameters:
   GUID String
   item String
   callback Function
   error Object
      Null if no error has occurred in executing this function, else an contains an object with the error that occurred.

```
_handleExistingAssociationMove
(
    GUID
    item
    ItemMirror
    callback
)
``` private
Defined in scripts/ItemMirror.js:1678
TODO: Document. Purpose and usage unknown as of Jul. 14, 2003
Parameters:
   GUID String
   item String
   ItemMirror Object
   callback Function
   error Object
      Null if no error has occurred in executing this function, else an contains an object with the error that occurred.

```
_handleExistingAssociationRename
(
    GUID
    item
    ItemMirror
    callback
)
``` private
Defined in scripts/ItemMirror.js:1705
TODO: Document. Purpose and usage unknown as of Jul. 3, 2014
Parameters:
　　GUID String
　　item String
　　ItemMirror Object
　　callback Function
　　error Object
　　　　Null if no error has occurred in executing this function, else an contains an object with the error that occurred.

```
_isCurrent
(
    callback
)
```

Boolean private async
Defined in scripts/ItemMirror.js:1244
Checks the local GUID and the remote GUID to see if the local fragment is out of date with the remote fragment.
Parameters:
　　callback Function
　　　　Function to execute once finished.
　　　　　　error Object
　　　　　　　　Null if no error has occurred in executing this function, else an contains an object with the error that occurred.
　　　　　　_isCurrent Boolean
　　　　　　　　True if the local GUID matches the remote GUID, else false.
Returns:
Boolean:
True if the local GUID matches the remote GUID, else false.

```
_isURL
(
    URL
)
```

Boolean private
Defined in scripts/ItemMirror.js:2214
Checks if the AssociatedItem String passed into it is a URL or not.
Parameters:
　　URL String
Returns:
Boolean:
True if it is an HTTP URL, false otherwise (HTTPS will fail)

```
_loadXooMLFragmentString
(
    uri
    callback
)
``` private
Defined in scripts/ItemMirror.js:1519
Sets the item driver specified in the options for the XooMLFragment.
Parameters:
　　uri Function
　　　　URI for the XooMLFragment
　　callback Function
　　error Object
　　　　Null if no error has occurred in executing this function, else an contains an object with the error that occurred.

```
_removeGroupingItemThroughAssociation
(
    GUID
    item
    callback
)
``` private
Defined in scripts/ItemMirror.js:1755
Removes a grouping item based on it's association. Must pass in a grouping item, or errors will be thrown.
Parameters:
　　GUID String
　　item String
　　callback Function
　　error Object
　　　　Null if no error has occurred in executing this function, else an contains an object with the error that occurred.

```
_removeNonGroupingItemThroughAssociation
(
    GUID
    item
    callback
)
``` private
Defined in scripts/ItemMirror.js:1732
Removes a non grouping item based on it's association. Must pass in a non grouping item, or errors will be thrown.
Parameters:
　　GUID String
　　item String
　　callback Function
　　error Object
　　　　Null if no error has occurred in executing this function, else an contains an object with the error that occurred.

```
_save
(
    GUID
    itemURI
    callback
)
``` private
Defined in scripts/ItemMirror.js:1404
Checks to see if the fragment is current, and if it isn't, then save it.
Parameters:
　　GUID String
　　itemURI String
　　callback Function
　　　　Function to execute once finished.
　　　　　　error Object

```
_saveAssociationAssociatedXooMLFragment
(
    GUID
    options
    callback
)
``` private
Defined in scripts/ItemMirror.js:1959
Saves the association
Parameters:
   GUID String
   options Object
   callback Function
      error Object
         Null if no error has occurred in executing this function, else an contains an object with the error that occurred.

```
_saveFragment
(
    callback
)
``` private
Defined in scripts/ItemMirror.js:1433
Saves the fragment
Parameters:
   callback Function
   Function to execute once finished.
      error Object
         Null if no error has occurred in executing this function, else an contains an object with the error that occurred.

```
_setAssociationLocalItemAndAssociatedItem
(
    GUID
    itemURI
    callback
)
```

Defined in scripts/ItemMirror.js:1375
Sets the associated and local item for the association to the same itemURI passed in.
Parameters:
   GUID String
   itemURI String
   callback Function
   Function to execute once finished.
      error Object
         Null if no error has occurred in executing this function, else an contains an object with the error that occurred.

```
addAssociationNamespaceAttribute
(
    attributeName
    GUID
    namespaceURI
)
```

Defined in scripts/ItemMirror.js:1022
Adds the given attributeName to the association with the given GUID and namespaceURI.
Throws NullArgumentException if attributeName, GUID, or namespaceURI is null.
Throws InvalidTypeException if attributeName, GUID, or namespaceURI is not a String.
Throws InvalidGUIDException if GUID is not a valid GUID.
Throws an InvalidStateException when the given attributeName has already been added.
Parameters:
   attributeName String
   Name of the attribute.
   GUID String
   GUID of the association.
   namespaceURI String
   URI of the namespace for the association.

```
addFragmentNamespaceAttribute
(
    attributeName
    GUID
    namespaceURI
    callback
)
```

Defined in scripts/ItemMirror.js:337
Adds the given attributeName to the association with the given GUID and namespaceURI.
Throws NullArgumentException if attributeName, GUID, or namespaceURI is null.
Throws InvalidTypeException if attributeName, GUID, or namespaceURI is not a String.
Throws InvalidGUIDException if GUID is not a valid GUID.
Throws an InvalidStateException when the given attributeName has already been added.
Parameters:
   attributeName String
   Name of the attribute.
   GUID String
   GUID of the association.
   namespaceURI String
   URI of the namespace for the association.
   callback Function
   Function to execute once finished.
      error Object
         Null if no error has occurred in executing this function, else an contains an object with the error that occurred.

```
createAssociation
(
    options
    callback
)
```

Defined in scripts/ItemMirror.js:553
Creates an association based on the given options and the following cases.
Cases 1, 2, 7 implemented. All else are not implemented.
   Simple text association declared phantom.
   Link to existing non-grouping item, phantom. This can be a URL
   Link to existing non-grouping item, real.
   Link to existing grouping item, phantom.
   Link to existing grouping item, real.
   Create new local non-grouping item.
   Create new local grouping item.

Throws NullArgumentException when options, or callback is null.
Throws InvalidTypeException when options is not an object and callback is not a function.
Throws MissingParameterException when an argument is missing for an expected case.
Parameters:
  options Object
  Data to create an new association for.
    displayText String
      Display text for the association. Required in all cases.
    itemURI String
      URI of the item. Required for case 2 & 3. Note: Please ensure "http://" prefix exists at the beginning of the string when referencing a Web URL and not an Item.
    localItemRequested Boolean
      True if the local item is requested, else false. Required for cases 2 & 3.
    groupingItemURI String
      URI of the grouping item. Required for cases 4 & 5.
    xooMLDriverURI String
      URI of the XooML driver for the association. Required for cases 4 & 5.
    itemName String
      URI of the new local non-grouping/grouping item. Required for cases 6 & 7.
    isGroupingItem String
      True if the item is a grouping item, else false. Required for cases 6 & 7.
  callback Function
  Function to execute once finished.
    error Object
      Null if no error has occurred in executing this function, else an contains an object with the error that occurred.
    GUID String
      GUID of the association created.

--- createItemMirrorForAssociatedGroupingItem
(
  GUID
)

---

ItemMirror
Defined in scripts/ItemMirror.js:488
Creates an ItemMirror from the associated grouping item represented by the given GUID.
Throws NullArgumentException if GUID or callback is null.
Throws InvalidTypeException if GUID is not a string, and callback is not a function.
Throws InvalidGUIDException if GUID is not a valid GUID.
Parameters:
  GUID String
  GUID of the association to create the ItemMirror from.
Returns:
ItemMirror:
Possibly return an itemMirror if the GUID is a grouping item

--- deleteAssociation
(
  GUID
  callback
)

---

Defined in scripts/ItemMirror.js:774
Deletes the association represented by the given GUID.
Throws NullArgumentException if GUID is null.
Throws InvalidTypeException if GUID is not a String.
Throws InvalidGUIDException if GUID is not a valid GUID.
Parameters:
  GUID String
  GUID of the association to be deleted.
  callback Function
  Function to execute once finished.
    error Object
      Null if no error has occurred in executing this function, else an contains an object with the error that occurred.

--- duplicateAssociation
(
  GUID
  ItemMirror
  callback
)

---

Defined in scripts/ItemMirror.js:638
Duplicates (copies) an association to another ItemMirror Object (representing a grouping item)
Throws NullArgumentException if GUID is null.
Throws InvalidTypeException if GUID is not a String.
Throws InvalidGUIDException if GUID is not a valid GUID.
Parameters:
  GUID String
  GUID of the association you wish to copy/duplicate
  ItemMirror ItemMirror
  ItemMirror representing the grouping item you want to move the GUID object to
  callback Function
  Function to execute once finished.
    error Object
      Null if no error Null if no error has occurred in executing this function, else it contains an object with the error that occurred.

--- getAssociatedItemOfAssociation
(
  GUID
)

---

String
Defined in scripts/ItemMirror.js:301
Throws NullArgumentException if GUID is null.
Throws InvalidTypeException if GUID is not a String.
Throws InvalidGUIDException if GUID is not a valid GUID.
Parameters:
  GUID String
  GUID of the association to get. association with the given GUID.
Returns:
String:
The associated item for the association with the given GUID.

getAssociationDisplayText
(
    GUID
)

String
Defined in scripts/ItemMirror.js:250
Throws NullArgumentException if GUID is null.
Throws InvalidTypeException if GUID is not a String.
Throws InvalidGUIDException if GUID is not a valid GUID.
Parameters:
    GUID String
    GUID of the association to get.
Returns:
String:
The display text for the association with the given GUID.

getAssociationLocalItemName
(
    GUID
)

String
Defined in scripts/ItemMirror.js:285
Throws NullArgumentException if GUID is null.
Throws InvalidTypeException if GUID is not a String.
Throws InvalidGUIDException if GUID is not a valid GUID.
Parameters:
    GUID String
    GUID of the association to get.
Returns:
String:
The local item for the association with the given GUID.

getAssociationNamespaceAttribute
(
    attributeName
    GUID
    namespaceURI
)

String
Defined in scripts/ItemMirror.js:998
Throws NullArgumentException if attributeName, GUID, or namespaceURI is null.
Throws InvalidTypeException if attributeName, GUID, or namespaceURI is not a String.
Throws InvalidGUIDException if GUID is not a valid GUID.
Parameters:
    attributeName String
    Name of the attribute to be returned.
    GUID String
    GUID of the association to return attribute from.
    namespaceURI String
    URI of the namespace for the association.
Returns:
String:
The association namespace attribute with the given attributeName and the given namespaceURI within the association with the given GUID.

getAssociationNamespaceData
(
    GUID
    namespaceURI
)

String
Defined in scripts/ItemMirror.js:1139
Throws NullArgumentException if GUID, namespaceURI is null.
Throws InvalidTypeException if GUID, namespaceURI is not a String.
Throws InvalidGUIDException if GUID is not a valid GUID.
Parameters:
    GUID String
    GUID of the association namespace data to returned.
    namespaceURI String
    URI of the namespace of the association namespace data to returned.
Returns:
String:
The association namespace data for an association with the given GUID and the given namespaceURI.

getDisplayName
(
    callback
)

String
Defined in scripts/ItemMirror.js:150
Parameters:
    callback Function
    Function to execute once finished.
        error Object
            Null if no error has occurred in executing this function, else an contains an object with the error that occurred.
        displayName String
            Display name.
Returns:
String:
The display name.

getFragmentNamespaceAttribute
(
    attributeName
    namespaceURI
)

String
Defined in scripts/ItemMirror.js:317
Throws NullArgumentException if attributeName or namespaceURI is null.
Throws InvalidTypeException if attributeName or namespaceURI is not a String.
Parameters:
    attributeName String
    Name of the attribute to be returned.
    namespaceURI String
    Name of the namespace of the given attributeName.
Returns:
String:
Returns the value of the given attributeName for the fragmentNamespaceData with the given namespaceURI.

| getFragmentNamespaceData |
| --- |
| ( |
|    namespaceURI |
| ) |

String
Defined in scripts/ItemMirror.js:453
Throws NullArgumentException if namespaceURI is null.
Throws InvalidTypeException if namespaceURI is not a String.
Parameters:
   namespaceURI String
      URI of the namespace to be set.
Returns:
String:
The fragment namespace data with the given namespaceURI.
getGUIDGeneratedOnLastWrite
( ) String private
Defined in scripts/ItemMirror.js:1363
Returns:
String:
The GUID generated on the last modification to the file.
getItemDescribed
( ) String
Defined in scripts/ItemMirror.js:195
Returns URI pointing to item described by the metadata of a fragment. A URI might point to just about anything that can be interpreted as a grouping item. For example: a conventional file system folder or a "tag as supported by any of several applications.
Returns:
String:
A URI pointing to item described by the metadata of a fragment if it exists, else returns null.
getItemDriver
( ) String
Defined in scripts/ItemMirror.js:212
An item driver supports HTML5 filesystem API. self driver must work hand in glove with SyncU. There is no exclusive control over items as stored in the dataStore so need to view and synchronize. Invoked directly to Open and Close. Delete, create. Invoked indirectly via UI.
Returns:
String:
The URI of the item driver.

| getItemList |
| --- |
| ( |
|    options |
|    callback |
| ) | private
Defined in scripts/ItemMirror.js:1560
Uses itemDriver to retrieve a list of items and creates corresponding XooMLFragments for the retrieved items in the list
Parameters:
   options Object
   callback Function
   error Object
      Null if no error has occurred in executing this function, else an contains an object with the error that occurred.

getItemMirrorFromWhichThisWasCreated
( ) Object
Defined in scripts/ItemMirror.js:1316
Returns:
Object:
The itemMirror that created this current itemMirror, if it has one. Note that this isn't the same as asking for a 'parent,' since multiple itemMirrors can possibly link to the same one
getParent
( ) Object
Defined in scripts/ItemMirror.js:1213
Returns:
Object:
Parent ItemMirror if this ItemMirror has a parent.
getSchemaLocation
( ) String
Defined in scripts/ItemMirror.js:184
Returns:
String:
XooML schema location.
getSchemaVersion
( ) String
Defined in scripts/ItemMirror.js:173
Returns:
String:
XooML schema version.
getSyncDriver
( ) String
Defined in scripts/ItemMirror.js:228
Returns:
String:
Returns the sync driver URI.
getXooMLDriver
( ) String
Defined in scripts/ItemMirror.js:239
Returns:
String:
The XooML driver.

| hasAssociationNamespace |
| --- |
| ( |
|    GUID |
|    namespaceURI |
| ) |

Boolean
Defined in scripts/ItemMirror.js:1071
Throws NullArgumentException if attributeName, GUID, or namespaceURI is null.
Throws InvalidTypeException if attributeName, GUID, or namespaceURI is not a String.
Throws InvalidGUIDException if GUID is not a valid GUID.
Parameters:
   GUID String
      GUID of the association.
   namespaceURI String
      URI of the namespace for the association.
Returns:
Boolean:
True if the association has the given namespaceURI, else false.

| hasFragmentNamespace |
| --- |
| ( |
|    namespaceURI |
| ) |

Boolean
Defined in scripts/ItemMirror.js:392
Checks if the fragment has the given namespaceURI.
Throws NullArgumentException if attributeName, or namespaceURI is null.
Throws InvalidTypeException if attributeName, or namespaceURI is not a String.
Parameters:
namespaceURI String
URI of the namespace for the association.
Returns:
Boolean:
True if the fragment has the given namespaceURI, otherwise false.

---
isAssociatedItemGrouping
(
GUID
)
---

Boolean
Defined in scripts/ItemMirror.js:915
Checks if an association's associatedItem is a grouping item
Throws NullArgumentException if GUID, callback is null.
Throws InvalidTypeException if GUID is not a String, and if callback is not an function.
Parameters:
GUID String
GUID of the association to be to be checked.
Returns:
Boolean:
True if the association with the given GUID's associatedItem is a grouping item, otherwise false.

---
isGroupingItem
(
GUID
callback
)
---

Boolean
Defined in scripts/ItemMirror.js:945
Checks if the Association is a grouping item, by checking if it has an Associated XooML Fragment.
Throws NullArgumentException if GUID, callback is null.
Throws InvalidTypeException if GUID is not a String, and if callback is not an function.
Parameters:
GUID String
GUID of the association to be to be checked.
callback Function
Function to execute once finished.
error Object
Null if no error has occurred in executing this function, else an contains an object with the error that occurred.
isGroupingItem Boolean
True if the association with the given GUID is a grouping item, else false.
Returns:
Boolean:
True if the association with the given GUID is a grouping item, otherwise false.

---
listAssociationNamespaceAttributes
(
GUID
namespaceURI
)
---

String[ ]
Defined in scripts/ItemMirror.js:1118
Throws NullArgumentException if GUID, namespaceURI is null.
Throws InvalidTypeException if GUID, namespaceURI is not a String.
Throws InvalidGUIDException if GUID is not a valid GUID.
Parameters:
GUID String
GUID of association to list attributes for.
namespaceURI String
URI of the namespace for the association.
Returns:
String[ ]:
An array of the association namespace attributes with the given attributeName and the given namespaceURI within the association with the given GUID.
listAssociations
( ) String[ ]
Defined in scripts/ItemMirror.js:984
Lists the GUIDs of each association.
Returns:
String[ ]:
Array of the GUIDs of each association of the given namespaceURI ---
listFragmentNamespaceAttributes
(
namespaceURI
)
---

String[ ]
Defined in scripts/ItemMirror.js:435
Throws NullArgumentException if namespaceURI is null.
Throws InvalidTypeException if namespaceURI is not a String.
Parameters:
namespaceURI String
Name of the namespace of the given attributeName.
Returns:
String[ ]:
An array of the attributes within the fragmentNamespaceData with the given namespaceURI.

---
moveAssociation
(
GUID
ItemMirror
callback
)
---

Defined in scripts/ItemMirror.js:703
Moves an association to another ItemMirror Object (representing a grouping item)
Throws NullArgumentException if GUID is null.
Throws InvalidTypeException if GUID is not a String.
Throws InvalidGUIDException if GUID is not a valid GUID.

Parameters:
  GUID String
    GUID of the item you want to paste or move
  ItemMirror ItemMirror
    ItemMirror representing the grouping item you want to move the GUID object to
  callback Function
    Function to execute once finished.
      error Object
        Null if no error Null if no error has occurred in executing this function, else it contains an object with the error that occurred.

```
refresh
(
  callback
)
```

Defined in scripts/ItemMirror.js:1186
Reloads the XooML Fragment
Parameters:
  callback Function
    Function to execute once finished.
      error Object
        Null if no error has occurred in executing this function, else an contains an object with the error that occurred.

```
removeAssociationNamespaceAttribute
(
  attributeName
  GUID
  namespaceURI
)
```

Defined in scripts/ItemMirror.js:1046
Removes the given attributeName to the association with the given GUID and namespaceURI.
Throws NullArgumentException if attributeName, GUID, or namespaceURI is null.
Throws InvalidTypeException if attributeName, GUID, or namespaceURI is not a String.
Throws InvalidGUIDException if GUID is not a valid GUID.
Throws an InvalidStateException when the given attribute-Name is not an attribute.
Parameters:
  attributeName String
    Name of the attribute.
  GUID String
    GUID of the association.
  namespaceURI String
    URI of the namespace for the association.

```
removeFragmentNamespaceAttribute
(
  attributeName
  namespaceURI
  callback
)
```

Defined in scripts/ItemMirror.js:366
Removes the fragment namespace attribute with the given namespaceURI.
Throws NullArgumentException if attributeName, or namespaceURI is null.
Throws InvalidTypeException if attributeName, or namespaceURI is not a String.
Throws an InvalidStateException when the given attribute-Name is not an attribute.
Parameters:
  attributeName String
    Name of the attribute.
  namespaceURI String
    URI of the namespace for the association.
  callback Function
    Function to execute once finished.
      error Object
        Null if no error has occurred in executing this function, else an contains an object with the error that occurred.

```
renameLocalItemOfAssociation
(
  GUID
  String
  callback
)
```

Defined in scripts/ItemMirror.js:877
Renames the local item for the association with the given GUID.
Throws NullArgumentException if GUID, callback is null.
Throws InvalidTypeException if GUID is not a String, and if callback is not a function.
Parameters:
  GUID String
    GUID of the association.
  String String
    String Name you want to rename the file to (including file extension)
  callback Function
    Function to execute once finished.
      error Object
        Null if no error has occurred in executing this function, else an contains an object with the error that occurred.

```
setAssociationDisplayText
(
  GUID
  displayText
)
```

Defined in scripts/ItemMirror.js:267
Sets the display text for the association with the given GUID.
Throws NullArgumentException if GUID or displayName is null.
Throws InvalidTypeException if GUID or displayName is not a String.
Throws InvalidGUIDException if GUID is not a valid GUID.
Parameters:
  GUID String
    GUID of the association to set.
  displayText String
    Display text to be set.

```
setAssociationNamespaceAttribute
(
    attributeName
    attributeValue
    GUID
    namespaceURI
)
```

Defined in scripts/ItemMirror.js:1093
Sets the association namespace attribute with the given attributeName and the given namespaceURI within the association with the given GUID.
Throws NullArgumentException if attributeName, attributeValue, GUID, or namespaceURI is null.
Throws InvalidTypeException if attributeName, attributeValue, GUID, or namespaceURI is not a String.
Throws InvalidGUIDException if GUID is not a valid GUID.
Parameters:
    attributeName String
    Name of the attribute to be set.
    attributeValue String
    Value of the attribute to be set
    GUID String
    GUID of association to set attribute for.
    namespaceURI String
    URI of the namespace for the association.

```
setAssociationNamespaceData
(
    data
    GUID
    namespaceURI
)
```

Defined in scripts/ItemMirror.js:1160
Sets the association namespace data for an association with the given GUID and given namespaceURI using the given data.
Throws NullArgumentException if data, GUID, or namespaceURI is null.
Throws InvalidTypeException if data, GUID, or namespaceURI is not a String.
Throws InvalidGUIDException if GUID is not a valid GUID.
Parameters:
    data String
    Association namespace data to set. Must be valid fragmentNamespaceData.
    GUID String
    GUID of the association namespace data to set.
    namespaceURI String
    URI of the namespace of the association namespace data to set.

```
setFragmentNamespaceAttribute
(
    attributeName
    attributeValue
    namespaceURI
)
```

Defined in scripts/ItemMirror.js:413
Sets the value of the given attributeName with the given attributeValue for the fragmentNamespaceData with the given namespaceURI.
Throws NullArgumentException if attributeName, attributeValue, or namespaceURI is null.
Throws InvalidTypeException if attributeName, attributeValue, or namespaceURI is not a String.
Parameters:
    attributeName String
    Name of the attribute to be set.
    attributeValue String
    Value of the attribute to be set.
    namespaceURI String
    Name of the namespace of the given attributeName.

```
setFragmentNamespaceData
(
    data
    namespaceURI
)
```

Defined in scripts/ItemMirror.js:469
Sets the fragment namespace data with the given namespaceURI.
Throws NullArgumentException if namespaceURI or data is null.
Throws InvalidTypeException if namespaceURI or data is not a String.
Parameters:
    data String
    Fragment namespace data to be set. Must be valid namespaceData.
    namespaceURI String
    URI of the namespace to be set.

```
sync
(
    callback
)
``` private
Defined in scripts/ItemMirror.js:1224
Uses the specified ItemDriver and SyncDriver to synchronize the local ItemMirror object changes. This is an implementation of Synchronization Driver which modifies the XooML Fragment according to the real structure under the item described.
Parameters:
    callback Function
    Function to execute once finished.
        error Object
        Null if no error has occurred in executing this function, else an contains an object with the error that occurred.
toString
( ) String
Defined in scripts/ItemMirror.js:1305
Returns:
String:
String representation of self

```
upgradeAssociation
(
    options
    callback
)
```

Defined in scripts/ItemMirror.js:821
Upgrades a given association without a local item. Local item is named by a truncated form of the display name of this ItemMirror if the localItemURI is not given, else uses given localItemURI. Always truncated to 50 characters.
Only Supports Simple Phantom Association to Association with Grouping Item
Throws NullArgumentException when options is null.
Throws MissingParameterException when options is not null and a required argument is missing.
Throws InvalidTypeException if GUID is not a string, and if callback is not a function.
Throws InvalidState if the association with the given GUID cannot be upgraded.
Parameters:
  options Object
  Data to construct a new ItemMirror with
    GUID String
      of the association to be upgraded. Required
    localItemURI String
      URI of the local item to be used if a truncated display name is not the intended behavior. Optional.
  callback Function
  Function to execute once finished.
    error String
      Null if no error has occurred in executing this function, else an contains an object with the error that occurred.

It will be appreciated that the computing systems and devices depicted and described herein are merely illustrative and are not intended to limit the scope of the present invention. The systems and/or devices may each include multiple interacting computing systems or devices, and may be connected to other devices that are not specifically illustrated, including through one or more networks such as the Internet, via the Web, or via private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, digital music player devices, handheld gaming devices, PDAs, wireless phones, pagers, electronic organizers, Internet appliances, television-based systems (e.g., using set-top boxes and/or personal/digital video recorders), and various other consumer products that include appropriate communication capabilities. In addition, the functionality provided by the described devices and systems may in some embodiments be distributed in various modules. Similarly, in some embodiments, some of the described functionality may not be provided and/or other additional functionality may be available.

It will also be appreciated that, while various items are illustrated and/or described as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs and/or data structures, such as by execution of software instructions of the one or more software programs and/or by storage of such software instructions and/or data structures. Furthermore, in some embodiments, some or all of the systems and/or modules may be implemented or provided in other manners, such as by consisting of one or more means that are implemented at least partially in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Those skilled in the art will appreciate that the Web pages, objects, classes, and other data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method for use of an itemMirror library in support of consistent storing and retrieving of metadata (formatted according to a XoomL schema), to be used in association with grouping items, wherein the grouping items group together references to other information items, the information items including references to web pages, files, and email messages, the method comprising:
the itemMirror library providing support, in software applications that use the library, for:
a. storing first metadata in association with a grouping item;
b. retrieving the first metadata previously stored in association with the grouping item;
c. storing second metadata in association with a reference in the grouping item, the reference corresponding to an information item;
d. retrieving the second metadata previously stored in association with the reference in the grouping item;
e. storing and retrieving grouping items, the information items referenced in any given grouping item and associated metadata for both a given grouping item and any of its references, no matter which device, application or service has primary responsibility for the grouping items, referenced information items or associated metadata; and
f. controlling concurrency of access to ensure that the modifications in metadata made by one software application are sequenced to occur strictly before or after the modifications made by another software application.

2. The computer-implemented method of claim 1 wherein the grouping items are folders as supported through a desktop operating system or through the cloud storage service.

3. The computer-implemented method of claim 1 wherein the first and second metadata stored, and later retrieved, is for a tool or application.

4. The computer-implemented method of claim 1 wherein the first and second metadata stored, and later retrieved, is specific to a metadata standard.

5. The computer-implemented method of claim 1 wherein the first and second metadata stored, and later retrieved, is generic and applies no matter which tool or application is using the data.

6. The computer-implemented method of claim 1 wherein the first and second metadata stored, and later retrieved, specifies a number of pseudo associations for a respective grouping item such that, for a given association so specified, the association does not refer to an information item but can, like other associations of a grouping item, have its own set of attribute/value combinations including an attribute that can contain an arbitrarily long string of text expressing, including the content of a paragraph of natural language.

7. The computer-implemented method of claim 1 wherein the first and second metadata stored, and later retrieved, can be used to represent differences in the state of the remaining metadata at two different points in time such that, for a given state of this remaining metadata and given a difference between this state t of metadata and a previous state t−1 of this metadata, the exact state of this metadata at state t−1 can be reconstructed for read-only viewing.

8. The computer-implemented method of claim 1 wherein the metadata in association with a reference in grouping item #1 to another grouping item #2 can be used to specify the locations of both grouping item #2 and its associated metadata and locations of drivers needed to retrieve, and later store revisions of, both grouping item #2 and its associated metadata.

9. A non-transitory computer-readable medium having stored contents that configure a computing device to perform a method, the method comprising:
an itemMirror library providing support, in software applications that use the library, for:
a. storing metadata in association with any grouping item;
b. retrieving metadata previously stored in association with any grouping item;
c. storing metadata in association with any reference in any grouping item to another information item;
d. retrieving metadata previously stored in association with any reference in any grouping item to another information item;
e. using drivers to store and retrieve information via an application programming interface (API) as supported by a separate application, database or cloud store service;
f. controlling concurrency of access to ensure that the modifications in metadata made by one software application are sequenced to occur strictly before or after the modifications made by another software application.

10. The computer-implemented method of claim 9 wherein the grouping items are folders as supported through a desktop operating system, or through a cloud storage service.

11. The computer-implemented method of claim 9 wherein some of the metadata stored, and later retrieved, is for the specific use of a tool or application.

12. The computer-implemented method of claim 9 wherein some of the metadata stored, and later retrieved, is specific to a metadata standard.

13. The computer-implemented method of claim 9 wherein some of the metadata stored, and later retrieved, is generic and applies no matter which tool or application is using the data.

14. The computer-implemented method of claim 9 wherein some of the metadata stored, and later retrieved, serves to specify any number of additional pseudo associations for a given grouping item such that, for a given association so specified, the association does not refer to an information item but can, like other associations of a grouping item, have its own set of attribute/value combinations including an attribute that can contain an arbitrarily long string of text expressing, for example, the content of a paragraph of natural language.

15. The computer-implemented method of claim 9 wherein some portion of the metadata stored, and later retrieved, can be used to represent differences in the state of the remaining metadata at two different points in time such that, for a given state of this remaining metadata and given a difference between this state t of metadata and a previous state t−1 of this metadata, the exact state of this metadata at state t−1 can be reconstructed for read-only viewing.

* * * * *